(12) United States Patent
Yao (10) Patent No.: US 12,291,060 B2
(45) Date of Patent: May 6, 2025

(54) PNEUMATIC TIRE

(71) Applicant: Sumitomo Rubber Industries, Ltd., Kobe (JP)

(72) Inventor: Masahiro Yao, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 800 days.

(21) Appl. No.: 17/350,276

(22) Filed: Jun. 17, 2021

(65) Prior Publication Data

US 2022/0009294 A1   Jan. 13, 2022

(30) Foreign Application Priority Data

Jul. 8, 2020   (JP) ................. 2020-117867

(51) Int. Cl.
| | |
|---|---|
| *B60C 15/06* | (2006.01) |
| *B60C 9/02* | (2006.01) |
| *B60C 13/00* | (2006.01) |
| *B60C 15/00* | (2006.01) |

(52) U.S. Cl.
CPC ...... *B60C 15/0603* (2013.01); *B60C 15/0036* (2013.01); *B60C 15/0607* (2013.01); *B60C 2009/0276* (2013.01); *B60C 2013/007* (2013.01); *B60C 2015/009* (2013.01); *B60C 2015/061* (2013.01); *B60C 2015/0621* (2013.01); *B60C 2200/04* (2013.01)

(58) Field of Classification Search
CPC ............................................. B60C 2013/007
See application file for complete search history.

(56) References Cited

U.S. PATENT DOCUMENTS

| 5,639,321 A | * | 6/1997 | Sakamoto ............... B60C 13/00 |
| | | | 152/546 X |
| 2005/0161141 A1 | * | 7/2005 | Nakagawa ............. B60C 13/00 |
| 2012/0145299 A1 | * | 6/2012 | Hino |
| | | | (Continued) |

FOREIGN PATENT DOCUMENTS

| EP | 2 676 808 A1 * | 12/2013 |
| EP | 2 905 151 A1 | 8/2015 |
| | (Continued) | |

OTHER PUBLICATIONS

English machine translation of JP 2-144202 A, Jun. 4, 1990.*
Extended European Search Report dated Nov. 5, 2021 for Application No. 21178356.8.

*Primary Examiner* — Adrienne C. Johnstone
(74) *Attorney, Agent, or Firm* — Birch, Stewart, Kolasch & Birch, LLP (57) ABSTRACT

A pneumatic tire includes a tread portion, sidewall portions, a pair of bead portions embedded with bead cores, and a carcass. The carcass includes a turned up ply including a main body portion extending between the bead cores, and a pair of turned up portions turned up around the bead cores from axially inside to outside. Each bead portion is provided with an inner apex rubber extending radially outward from the bead core between the main body portion and the turned up portion and an outer apex rubber arranged axially outside the turned up portion. The inner apex rubber has a radial height of from 18 to 30 mm. A buttress thickness D, a maximum width thickness E, and a bead thickness F satisfy expressions E≥4.5 mm, F≥9.0 mm, E/D=0.6 to 0.9, and F/E=1.7 to 2.2.

20 Claims, 3 Drawing Sheets

(56) References Cited

U.S. PATENT DOCUMENTS

2016/0200150 A1 7/2016 Yamamoto et al.
2021/0394563 A1* 12/2021 Saeki .................... B60C 13/00

FOREIGN PATENT DOCUMENTS

| EP | 3 357 715 A1 | | 8/2018 |
|----|---|---|---|
| JP | 02144202 A | * | 6/1990 |
| JP | 2002-160510 A | | 6/2002 |
| JP | 2016-147567 A | | 8/2016 |
| JP | 2018-39276 A | | 3/2018 |
| WO | WO-2020/100978 A1 | * | 5/2020 |

* cited by examiner

PNEUMATIC TIRE

This application claims the benefit of foreign priority to Japanese Patent Applications No. JP2020-117867, filed Jul. 8, 2020, which is incorporated by reference in its entirety.

TECHNICAL FIELD

The present invention relates to a pneumatic tire.

BACKGROUND ART

Patent Document 1 listed below has described a pneumatic tire having bead portions provided with fillers in which filler cords are arranged. Further, Patent Document 2 listed below has described a pneumatic tire having bead portions provided with fillers made of rubber.

PRIOR ART DOCUMENT

Patent Document

Patent Document 2

Japanese Unexamined Patent Application Publication No. 2016-147567

Patent Document 1

Japanese Unexamined Patent Application Publication No. 2018-39276

SUMMARY OF THE INVENTION

Problems to be Solved by the Invention

Pneumatic tires need to be easy to remove from wheel rims when changing tires and the like. However, in the tire described in Patent Document 1, bending rigidity of the bead portions are excessively increased by the fillers having the cords, which makes it difficult to remove from wheel rims.

On the other hand, the pneumatic tire described in Patent Document 2 was improved in terms of removability from wheel rims, but there was room for improvement in terms of wobbling during lane changes and durability, especially the durability in outer portions in a tire radial direction from outer edges of the fillers.

The present invention was made in view of the above, and a primary object thereof is to provide a pneumatic tire capable of improving steering stability and durability without compromising removability from the rims.

Means for Solving the Problems

The present invention is a pneumatic tire including a tread portion, a pair of sidewall portions, a pair of bead portions each in which a bead core is embedded, and a toroidal carcass, wherein the carcass includes at least one turned up ply, the turned up ply includes a main body portion extending between the bead cores in a toroidal manner, and a pair of turned up portions each turned up portion turned up around a respective one of the bead cores from an inside to an outside in a tire axial direction, each bead portion of the pair of the bead portions is provided with an inner apex rubber extending from the respective bead core outward in a tire radial direction between the main body portion and the respective turned up portion of the turned up ply and an outer apex rubber arranged adjacent to and axially outside the respective turned up portion, a height in the tire radial direction of the inner apex rubber is in a range of from 18 to 30 mm, and wherein a buttress thickness D which is the shortest distance from a tire outer surface to the carcass at a position (P1) radially inwardly away from a maximum tire diameter position by 23% of a tire section height, a maximum width thickness E which is the shortest distance from the tire outer surface to the carcass at a maximum tire width position, and a bead thickness F which is the shortest distance from the tire outer surface to the carcass at a position (P2) radially outwardly away from a bead baseline by 25 mm satisfy the following Expressions (1) to (4):

$E \geq 4.5$ mm  (1)

$F \geq 9.0$ mm  (2)

$E/D = 0.6$ to $0.9$  (3)

$F/E = 1.7$ to $2.2$  (4).

In another embodiment of the present invention, the outer apex rubber may be formed of a rubber composition having a loss tangent tan $\delta$ of 0.13 or less.

In one of other embodiments of the present invention, the outer apex rubber may be formed of a rubber composition having a complex elastic modulus $E^*$ of 23 MPa or higher.

In one of other embodiments of the present invention, the outer apex rubber may have a thickness of 0.5 mm or more.

In one of other embodiments of the present invention, the outer apex rubber may be arranged over 50% or more of a radial area from the position (P2) to the maximum tire width position.

In one of other embodiments of the present invention, an insulation rubber may be arranged between the main body portion and each of the turned up portions of the turned up ply.

In one of other embodiments of the present invention, the insulation rubber may have a thickness of 0.5 mm or more.

In one of other embodiments of the present invention, a difference between the complex elastic modulus of the insulation rubber and the complex elastic modulus of a topping rubber of the turned up ply may be 2 MPa or less.

In one of other embodiments of the present invention, each of heights of the turned up portions of the turned up ply from the bead baseline may be 50% or more of the tire section height.

In one of other embodiments of the present invention, an outer end in the tire radial direction of each of the outer apex rubbers may be arranged radially inside an outer end in the tire radial direction of a respective one of the turned up portions.

In one of other embodiments of the present invention, a distance in the tire radial direction between the outer end of the outer apex rubber and the outer end in the tire radial direction of the turned up portion may be 5 mm or more.

In one of other embodiments of the present invention, the pneumatic tire may be a light truck tire.

Effects of the Invention

The pneumatic tire of the present invention can improve the steering stability and the durability without compromising the removability from the rims.

MODE FOR CARRYING OUT THE INVENTION

An embodiment of the present invention will now be described in conjunction with accompanying drawings.

Figure 1:
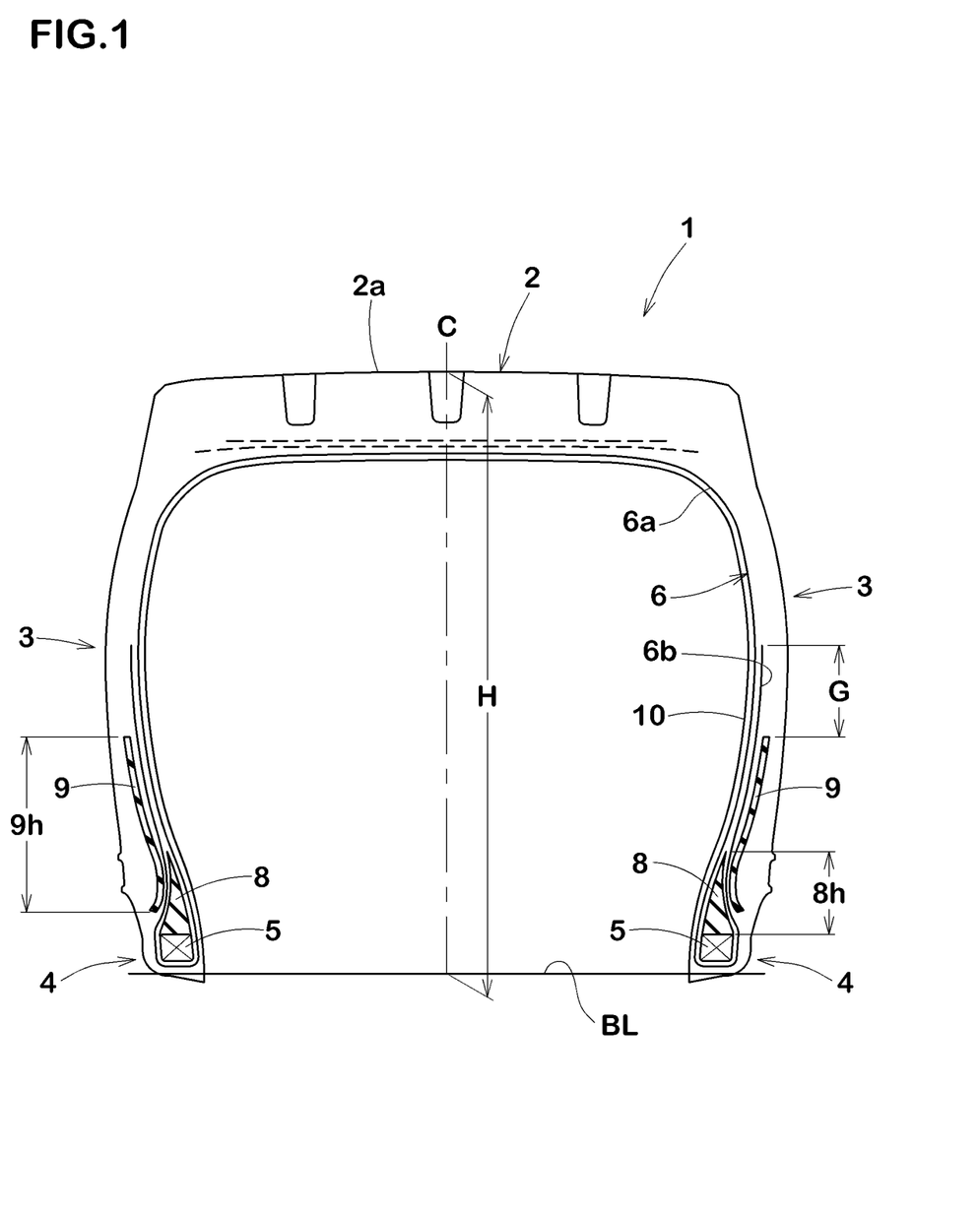
FIG. 1 a cross-sectional view of a pneumatic tire showing an embodiment of the present invention.
Figure 2:
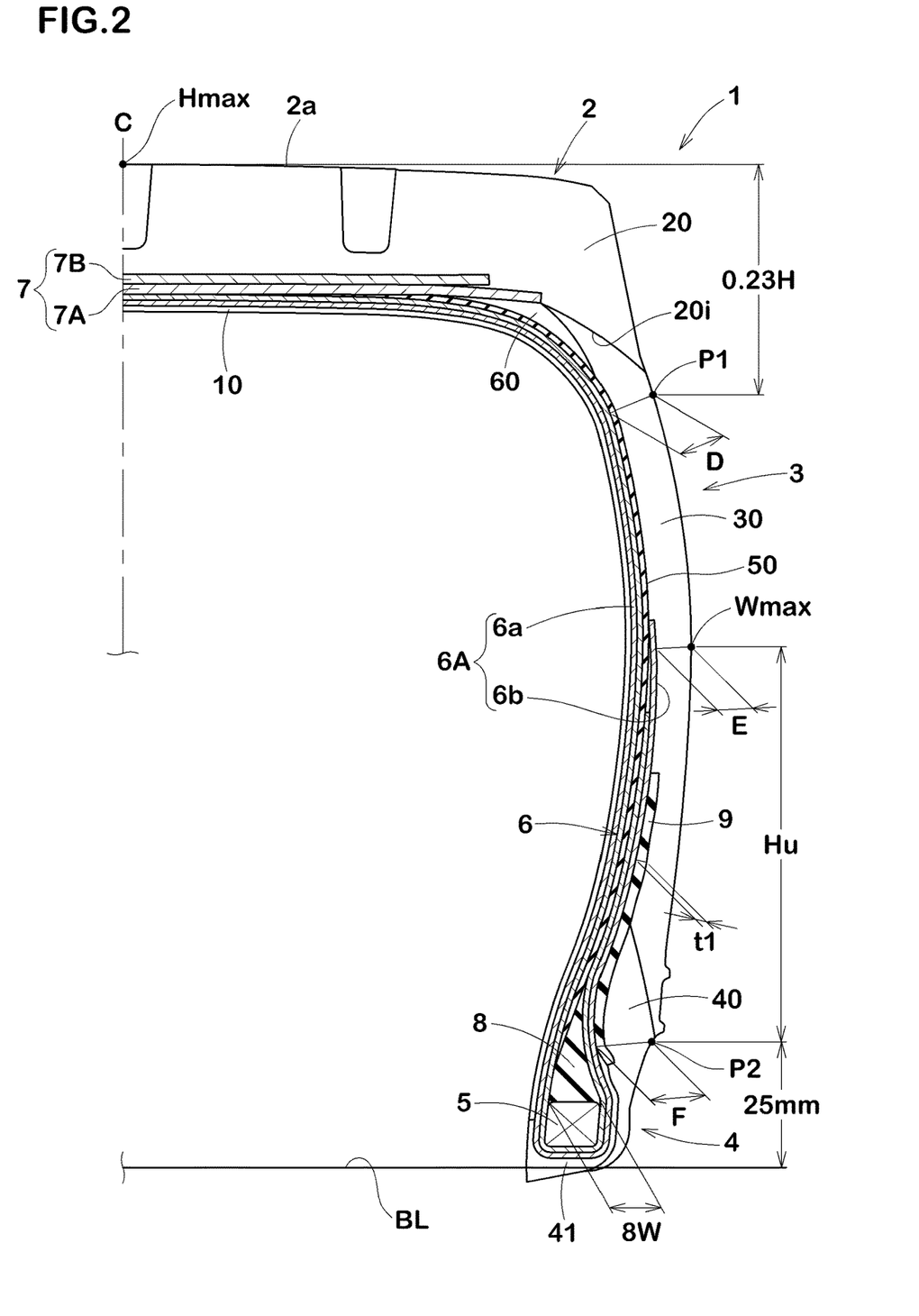
FIG. 2 an enlarged partial view showing the right half of FIG. 1.

FIG. 1 shows a cross-sectional view of a pneumatic tire according to an embodiment of the present invention. FIG. 2 is an enlarged partial view of the main part showing the right half of FIG. 1.

[Standard State of Pneumatic Tire]

FIGS. 1 and 2 show a pneumatic tire 1 in a standard state. The standard state of the pneumatic tire 1 is to unambiguously determine the state of pneumatic tire 1 and is defined as the state of the pneumatic tire 1 mounted on a standard rim (not shown), inflated to a standard inner pressure, and loaded with no tire load. In the following, unless otherwise noted in the present specification, dimensions and the like of various parts of the pneumatic tire 1 are to be understood as the values measured in this standard state.

Further, in the present specification, the standard rim refers to a rim having a rim width suitable for effective performance of the pneumatic tire 1. The "standard rim" can be a wheel rim specified for the concerned tire by a standard included in a standardization system on which the tire is based, specifically, the "normal wheel rim" in JATMA, "Design Rim" in TRA, and "Measuring Rim" in ETRTO, for example.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

[Basic Tire Structure]

As shown in FIGS. 1 and 2, the pneumatic tire 1 includes a tread portion 2, a pair of sidewall portions 3, a pair of bead portions 4 each of which has a bead core 5 embedded in it, and a toroidal carcass 6. It should be noted that an inner liner rubber 10 is arranged radially inside the carcass 6 to hold the air.

In the present embodiment, a light truck tire with a relatively large tire section height (H) and a relatively large working load is illustrated as the pneumatic tire 1. The light truck tires are specified in Chapter B of the JATMA YEAR BOOK, for example.

[Tread Portion]

The tread portion 2 is the part that defines a ground contacting surface (2a), which is to be in contact with the ground when the tire runs. The tread portion 2 of the present embodiment is provided with a tread rubber 20 that forms the ground contacting surface (2a). Further, in the tread portion 2, a belt layer 7 is arranged between the tread rubber 20 and the carcass 6.

The ground contacting surface (2a) means the surface of the tread portion 2 to be in contact with the ground w % ben the pneumatic tire 1 in the standard state is in contact with a flat surface with zero camber angle by being loaded with a standard tire load. Further, in the present specification, the "standard tire load" is a tire load specified for the concerned tire by a standard included in a standardization system on which the tire is based, the "maximum load capacity" in JATMA, maximum value listed in "TIRE LOAD LIMITS AT VARIOUS COLD INFLATION PRESSURES" table in TRA, and "LOAD CAPACITY" in ETRTO.

[Belt Layer]

The belt layer 7 is formed of a plurality of (two in the present embodiment) belt plies 7A and 7B in which steel cords are arranged, for example. The belt plies 7A and 7B have a plurality of belt cords arranged at an angle of, for example, 15 to 35 degrees with respect to a tire equatorial plane (C). Steel cords are suitable as the belt cords. Further, the belt plies 7A and 7B are overlapped so that their respective belt cords cross each other. The belt layer 7 configured as such increases the bending rigidity and torsional rigidity of the tread portion 2.

[Sidewall Portion]

The sidewall portions extend inward in the tire radial direction from both ends of the tread portion 2, and constitute the sidewall parts of the tire. The sidewall portions 3 of the present embodiment mainly consist of the carcass 6 and sidewall rubbers 30 arranged axially outside the carcass. A radially outer end of each of the sidewall rubbers 30 extends to a radially inner side surface (20i) of the respective tread rubber 20, for example. It should be noted that the reference number 60 is assigned to a belt cushion rubber. Further, a radially inner end of each of sidewall rubbers 30 extends to the respective bead portion 4.

The sidewall rubbers 30 are formed of a rubber composition that has excellent external damage resistance and bending properties. In a preferred embodiment, the sidewall rubbers 30 are formed of a rubber composition having a complex elastic modulus E* of about 3.0 to 4.0 MPa, for example.

In the present specification, viscoelastic properties (complex elastic modulus E* and loss tangent tan δ) of the rubber composition shall be measured under the following conditions by using a viscoelastic spectrometer in accordance with the provisions of Japanese Industrial Standard JIS K6394.

initial strain: 10%
Amplitude: ±1
Frequency: 10 Hz
Deformation mode: Tensile
Measurement temperature: 70° C.

[Bead Portion]

The bead portions 4 are each formed at the radially inner end of the respective sidewall portion 3 and are used to mount the pneumatic tire 1 on a wheel rim (not shown). The bead portions are each embedded with the non-elongating bead core 5 made of steel wire and the like, for example. Further, a clinch rubber 40 made of hard rubber is arranged at the part, which is to be in contact with the rim, of the axially outer surface of each of the bead portions 4. In addition, a chafer rubber 41 made of hard rubber is arranged at the part, which is to be in contact with a rim seat, of each of the bead portions 4.

[Carcass]

In the present embodiment, the carcass 6 includes at least one turned up ply 6A. The carcass 6 in the present embodiment includes, for example, a plurality of (two in the present embodiment) of the turned up plies 6A. In other embodiments, the carcass 6 may be formed by a combination of the turned up ply 6A and a non-turned up ply (not shown).

For each turned up ply 6A, a cord ply in which a plurality of carcass cords is arranged along the longitudinal direction and coated with a topping rubber is used, for example. As the carcass cords described above, organic fiber cords such as nylon, polyester, rayon, polyethylene terephthalate, and the like may be used, for example. Further, steel cords may also be used for the carcass cords, if necessary.

Each of the turned up plies 6A includes a main body portion (6a) extending between the bead cores 5 and a pair of turned up portions (6b) each turned up around a respective one of the bead cores 5 from an inside to an outside in the tire axial direction. Further, the carcass cords of each of the turned up plies 6A are arranged at an angle of 80 to 90 degrees with respect to the tire equator, for example. In other words, the carcass 6 of the present embodiment has a radial structure.

It is preferred that a height of the turned up portions (6b) of the turned up ply 6A from a bead baseline (BL) is 50% or more of the tire section height (H), for example. In this way, the turned up portions (6b) can reinforce not only the bead portions 4 but also the sidewall portions 3, therefore, they are helpful to improve the steering stability. It should be noted that if the tire has a plurality of the turned up plies 6A, the height of the turned up portions (6b) is identified by the highest turned up portion.

In the present specification, "bead baseline" means a tire axial line passing through the position of the rim diameter of the standard rim. Further, in the present specification, "tire section height" is a distance in tire radial direction from the bead baseline to the maximum tire diameter position. It should be noted that the maximum tire diameter position (Hmax) is determined based on the profile of the ground contacting surface (2a) of the tread portion 2, and if a groove or other recess is provided in the tread portion 2, the above profile is specified as a virtual profile obtained by filling this recess.

Each bead portion of the pair of the bead portions 4 is provided with an inner apex rubber 8 and an outer apex rubber 9.

[Inner Apex Rubber]

The inner apex rubber 8 is arranged between the main body portion (6a) and each of the turned up portions (6b) of the turned up ply 6A, and extends outward in the tire radial direction from the respective bead core 5. The inner apex rubbers 8 moderately increase the bending rigidity of the bead portions 4 and improve the steering stability and the durability. From such a point of view, the complex elastic modulus E* of the inner apex rubbers 8 is preferably 18 MPa or higher, more preferably 22 MPa or higher, and even more preferably 24 MPa or higher.

On the other hand, if the complex elastic modulus E* of the inner apex rubbers 8 is excessively high, it may impair the removability from the rim. From such a point of view, the complex elastic modulus E* of the inner apex rubbers 8 is preferably 36 MPa or lower, more preferably 32 MPa or lower, and even more preferably 30 MPa or lower.

In the present embodiment, each of the inner apex rubbers 8 tapers outward in a tire radial direction, for example. Correspondingly, each of the turned up portions (6b) of the turned up ply 6A in this embodiment includes an arc-shaped curved portion that is convex toward the respective inner apex rubber 8 along the axially outer side surface thereof. The structure of the turned up portions (6b) configured as such is desirable in that it reduces compression set acting on the carcass cords of the turned up portions (6b) during tire running, and thus prevents damage originating from the turned up portions (6b).

A height (8h) in the tire radial direction of each of the inner apex rubbers 8 is in the range of from 18 to 30 mm, for example. The height (8h) of the inner apex rubber 8 is the height in the tire radial direction from the radially outer surface of the respective bead core 5 to the radially outer end of the inner apex rubber 8.

If the height (8h) of the inner apex rubber 8 is less than 18 mm, the basic bending rigidity of the respective bead portion 4 cannot be ensured, therefore, the steering stability tends to be decreased. From such a point of view, the height (8h) of each of the inner apex rubbers 8 is preferably 19 mm or more, more preferably 20 mm or more, and even more preferably 21 mm or more.

On the other hand, if the height (8h) of each of the inner apex rubbers 8 is larger than 30 mm, the outer edge of each of the inner apex rubbers 8 would be close to the area where the strain during running is large, which may cause damage originating from the outer edge of the respective inner apex rubber 8 and may result in the decrease in the durability. From such a point of view, the height (8h) of the inner apex rubber 8 is preferably 29 mm or less, more preferably 28 mm or less, and even more preferably 27 mm or less.

[Outer Apex Rubber]

The outer apex rubber 9 is arranged adjacent to and axially outside each of the turned up portions (6b) of the turned up ply 6A, and extends in the tire radial direction. Each of the outer apex rubber 9 supports the respective turned up portion (6b) from the outside in the tire axial direction, therefore, the bending rigidity of the respective bead portion 4 is further increased, thereby, bending strain of the respective bead portion 4 during tire running can be reduced.

In the present embodiment, each of the outer apex rubbers 9 is made of a rubber sheet having a substantially constant thickness, for example. A maximum thickness (t1) of each of the outer apex rubbers 9 is smaller than a maximum width (8W) in the tire axial direction of each of the inner apex rubbers 8, for example. This helps reduce the weight of the bead portions 4.

As described above, since the bead portions 4 in the present embodiment are reinforced by the outer apex rubbers 9 which do not have cords and the inner apex rubbers 8 and since the bead portions 4 do not have filler cords, the deterioration of the removability from the wheel rim is prevented.

[Thickness of Various Parts of Tire]

In order to improve the steering stability during lane changes and the durability (especially the durability in the parts radially outside the outer ends of the inner apex rubbers), it is necessary to specify the thickness of each part of the tire while assuming the structure of the bead portions 4 described above. In the present embodiment, from such a point of view, a buttress thickness D, a maximum width thickness E and a bead thickness F are configured to satisfy the following relations (1) to (4).

$$E \geq 4.5 \text{ mm} \tag{1}$$

$$F \geq 9.0 \text{ mm} \tag{2}$$

$$E/D = 0.6 \text{ to } 0.9 \tag{3}$$

$$F/E = 1.7 \text{ to } 2.2 \tag{4}$$

Here, the "buttress thickness D" is the shortest distance from the outer surface of the tire to the carcass 6 at a position (P1) which is a position radially inwardly away from the maximum tire diameter position (Hmax) by 23% of the tire section height (H). Further, the "maximum width thickness E" is the shortest distance from the outer surface of the tire to the carcass 6 at a maximum tire width position (Wmax).

Furthermore, the "bead thickness F" is the shortest distance from the outer surface of the tire to the carcass 6 at a position (P2) positioned radially outwardly away from the bead baseline (BL) by 25 mm.

The maximum tire width position (Wmax) and the position (P2) described above of the pneumatic tire 1 are typical locations where the bending strain is high during running. When Expressions (1) and (2) are satisfied, the durability of the pneumatic tire 1 is maintained by regulating the thicknesses at these locations.

Specifically, the maximum width thickness E is set to E≥4.5 mm (Expression (1)), more preferably E≥4.8 mm, and even more preferably E≥5.0 mm. On the other hand, if the maximum width thickness E is excessively large, the heat generated during running tends to be increased. From such a point of view, the maximum width thickness E may be set to E≤6.0 mm, and preferably E≤5.5 mm, for example.

The position (P2) that defines the bead thickness F corresponds to a position around the radially outer end of a flange of the wheel rim, and is subject to large deformation during cornering and lane change. Therefore, defining the thickness at this position is important for improving the durability of the pneumatic tire 1. From such a point of view, the bead thickness F is set to F≥9.0 mm (Expression (2)), but preferably F≥9.5 mm. On the other hand, if the bead thickness F is excessively large, the heat generated in the bead portions 4 during running tends to be increased. From such a point of view, the bead thickness F is set to F≤10.5 mm and preferably F≤10.0 mm, for example.

In the present embodiment, the maximum width thickness E is specified in relation to the buttress thickness D in order to improve the steering stability. The position (P1) that defines the buttress thickness D is located near the boundary between the tread portion 2 and the respective sidewall portion 3. Therefore, by relating the maximum width thickness E to the buttress thickness D, rigidity balance can be improved in the section from the position (P1) of the sidewall portion 3 to the maximum tire width position (Wmax). In the present embodiment, the maximum width thickness E and the buttress thickness D are set to E/D=0.6 to 0.9 (Expression (3)) in order to improve the steering stability during lane changes.

If the ratio ED is lower than 0.6, the rigidity in the vicinity of the maximum tire width position (Wmax) is relatively decreased, therefore, the steering stability is decreased mainly during cornering. From the point of view like this, it is more preferred that the ratio E/D be set to 0.7 or higher. On the other hand, if the aforementioned ratio E/D is higher than 0.9, the rigidity in the vicinity of the buttress (the position (P1)) is relatively decreased, therefore, responsiveness, convergence, and the like are decreased mainly during lane change and the like. From such a point of view, it is more preferred that the ratio E/D be set to 0.8 or lower.

Further in the present embodiment, the bead thickness F is specified in relation to the maximum width thickness E in order to improve the durability at the bead portions 4. In other words, the ratio F/E of these thicknesses is set to F/E=1.7 to 2.2 (Expression (4)). Here, if the ratio F/E is lower than 1.7, the strain in the bead portions 4 tends to be increased during running, therefore, damage is more likely to occur in the bead portions 4. From such a point of view, it is particularly preferred that the ratio F/E be set to 1.8 or higher. On the other hand, if the ratio F/E described above is larger than 2.2, the strain tends to be concentrated near the maximum tire width position (Wmax), therefore, damage is likely to occur in the section from that area to the position (P2). From such a point of view, the ratio F/E is preferably 2.1 or less, and more preferably 2.0 or less.

As described above, the pneumatic tire 1 of the present embodiment can improve the steering stability and the durability without impairing the removability from the rim by setting the rigidity balance right at the side portions of the tire. A more preferred embodiment of the present invention will be described below.

The outer apex rubber 9 is preferably formed of a rubber composition having the loss tangent tan δ of 0.13 or less and more preferably 0.12 or less, for example. The outer apex rubber 9 configured as such suppresses the heat generation in the outer apex rubber 9 during running and further improves the durability of the bead portions 4.

Further, it is preferred that the outer apex rubber 9 is formed of a rubber composition having the complex elastic modulus E* of 23 MPa or higher, preferably 26 MPa or higher. The outer apex rubber 9 configured as such reduces the bending strain and the like of the bead portions 4, and further improves the durability of the bead portions 4. On the other hand, if the complex elastic modulus E* of the outer apex rubber 9 is excessively large, ride comfort and the removability from the rim may be deteriorated, therefore, it is preferred that the complex elastic modulus E* is set to 30 MPa or less.

The maximum thickness (t1) of the outer apex rubber 9 is preferably 0.5 mm or more and more preferably 1.0 mm or more, for example. The outer apex rubber 9 configured as such can further improve the durability of the bead portions 4 and further suppress wobbling during lane changes. On the other hand, if the maximum thickness (t1) of the outer apex rubber 9 is excessively large, it may become difficult to remove from the rim and heat generation durability of the bead portions 4 may deteriorate. In this regard, the maximum thickness (t1) of the outer apex rubber 9 is 2.0 mm or less, and more preferably 1.5 mm or less, for example.

It is preferred that the outer apex rubber 9 is arranged over at least 50% of a radial area (Hu) from the position (P2) to the maximum tire width position (Wmax). The outer apex rubber 9 configured as such disperse or reduce the strain in the section from the position (P2) to the maximum tire width position (Wmax), therefore, the durability can be further improved. In a more preferred embodiment, the outer apex rubber 9 is preferably arranged over 60% or more, and even more preferably 65% or more, of the radial area from the position (P2) to the maximum tire width position (Wmax).

It is preferred that the radially inner end of the outer apex rubber 9 is located radially inside the position (P2). As described above, the position (P2) corresponds to the position near the outer end of the rim flange when the pneumatic tire 1 is mounted on the wheel rim. Therefore, each of the bead portions 4 tends to flex starting from around this position (P2) during running. Therefore, it is preferred that the inner end of the outer apex rubber 9 is defined so that it can reinforce the area around the position (P2) of the respective bead portion 4.

By the way, the strain tends to concentrate at the outer ends of the turned up portions (6b) during running. On the other hand, since the outer apex rubber 9 is formed of a rubber composition having a relatively high rigidity, it tends not to follow the deformation of the turned up portions (6b) sufficiently during running. Therefore, it is preferred that the outer apex rubbers 9 are arranged so that they are not subjected to large strain during running. In other words, it is preferred that the outer end of each of the outer apex rubbers 9 is positioned radially inside the outer end of the respective one of the turned up portions (6b) so as not to cover the outer end of the turned up portion (6b). As a result, the turned up portions (6b) are covered with the sidewall rubbers 30, which have a lower complex modulus than the outer apex rubbers 9, therefore, peeling damage and the like originating from the turned up portions (6b) is suppressed.

Further as shown in FIG. 1, it is preferred that a radial distance (G) from the outer end of the outer apex rubber 9 to the radially outer end of the turned up portion (6b) is 5 mm or more. Thereby, it is possible that the outer end of the outer apex rubber 9 is arranged far enough away from the position of high strain. Therefore, damage originating from the outer ends of the outer apex rubbers 9 is effectively suppressed.

During running with high tire load, a large shearing strain is repeatedly generated between the main body portion (6a) and the turned up portions (6b) of the turned up ply 6A, which may cause damage such as ply separation and cord separation. In order to suppress these separations, it is preferred that an insulation rubber 50 is arranged between the main body portion (6a) and the turned up portions (6b). The insulation rubber 50 of the present embodiment is formed of a sheet rubber composition.

Figure 3:
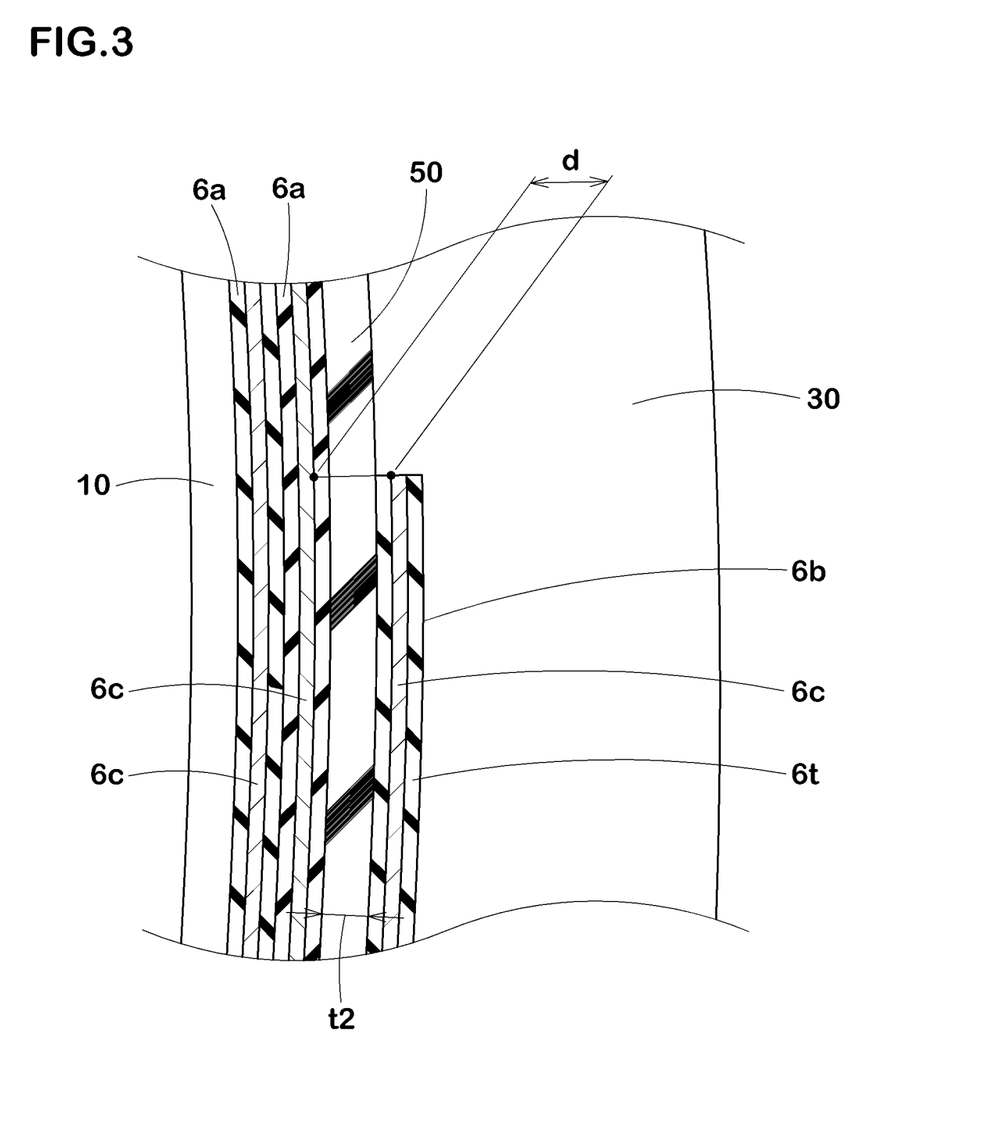
FIG. 3 an enlarged partial view showing an area around a maximum tire width position in FIG. 2.

FIG. 3 is an enlarged partial view of the area around the maximum tire width position (Wmax) in FIG. 2. As shown in FIG. 3, the insulation rubber 50 ensures a sufficient distance (d) between the carcass cords 6c between the main body portion (6a) and each of the turned up portions (6b), therefore, shear stress acting between them is relieved, thereby, separation and the like can be suppressed. From such a point of view, it is preferred that a maximum thickness (t2) of the insulation rubber 50 is 0.5 mm or more, for example. On the other hand, if the maximum thickness (t2) of the insulation rubber is increased, it may cause deterioration of the heat generation durability and rolling resistance. Therefore, it is preferred that the maximum thickness (t2) of the insulation rubber is 1.5 mm or less, for example.

The insulation rubber 50 can be of the same rubber composition as the topping rubber (6t) of the turned up ply 6A, or it can be of a different rubber composition. In the latter case, in order to eliminate rigidity difference between the main body portion (6a) and the turned up portions (6b), it is preferred that the difference in the complex modulus between the insulation rubber 50 and the topping rubber (6t) of the turned up ply 6A is 2 MPa or less. As described above, by limiting the difference in the complex modulus between the topping rubber (6t) and the insulation rubber 50, the strain is effectively dispersed between the carcass cords 6c of the main body portion (6a) and the turned up portions (6b) and by suppressing the separations and the like, the durability is further improved.

The insulation rubber 50 of the present embodiment is arranged over the entire area between the main body portion (6a) and each of the turned up portions (6b) of the turned up ply 6A. Further, the insulation rubber 50 extends beyond the outer end of a respective one of the turned up portions (6b) in the tire radial direction outward. More specifically, the radially outer end of the insulation rubber 50 is sandwiched between the belt layer 7 and the carcass 6. In such an embodiment, since the outer end of the insulation rubber 50 is arranged in a region of low strain, damage originating from the outer end of the insulation rubber can be suppressed, therefore, the durability is further improved.

Further, an inner end in the tire radial direction of the insulation rubber 50 of the present embodiment extends and terminates between an axially inner side surface of the inner apex rubber 8 and the main body portion (6a). In such an embodiment, since the inner end of the insulation rubber 50 is arranged in a region of low strain, damage originating from the inner end of the insulation rubber 50 can also be suppressed, therefore, the durability is further improved.

While detailed description has been made of the tire according to an embodiment of the present invention, the present invention can be embodied in various forms within the scope of the technical ideas described in the claims without being limited to the above specific disclosure.

Examples

Next, more detailed examples of the present invention will be described. However, the present invention is not limited to these examples.

Pneumatic radial tires for light trucks having the basic structure shown in FIG. 1 were made by way of test according to the specifications listed in Tables shown below. Further, for comparison, reference tires not having the structure of the present invention were also tested in the same manner. Major common specifications of the test tires were as follows.

Tire size: 205/85R16 117/115N

Tire rim: 5.5 J

Height of Turned up portion: 0.63H

Complex elastic modulus E* of Sidewall portion: 3.4 MPa

Complex elastic modulus E* of Inner apex rubber: 26 MPa

Height of Outer apex rubber: 0.37H

Description of the tests is as follows.

[Workability in Removal from Rims]

A tire changer was used to mount and dismount the test tires on the rim ten times for each tire. An observer then observed the bead portions of each tire with the naked eyes and evaluated the degree of scratches on the bead portions as "rim removal property" on a 10-point scale. The higher the numerical value, the better the result is.

[Steering Stability]

Each test tires was mounted on a light truck, then while the light truck was driven on a test course, the driver evaluated the degree of wobble of the truck during lane changes. The results are indicated by an index based on the degree of wobble of Example 1 being 10, wherein the larger numerical value is better.

Tire inner pressure: 600 kPa

Load capacity of Light truck: 2 tons

[Durability]

By using a drum testing machine, each test tire was run continuously under the following conditions, and the distance until the tire was damaged was measured. The results are indicated by an index based on the running distance of Example 1 being 10, wherein the larger numerical value shows the better result.

Tire inner pressure: 600 kPa

Longitudinal load: 20 kN

Running speed: 80 km/h

Test results are shown in Table 1 and table 2.

TABLE 1

|  | Ex.1 | Ex.2 | Ex.3 | Ex.4 | Ex.5 | Ex.6 | Ex.7 | Ex.8 | Ex.9 | Ex.10 | Ex.11 |
|---|---|---|---|---|---|---|---|---|---|---|---|
| Height of Inner apex rubber [mm] | 23 | 23 | 23 | 23 | 23 | 23 | 23 | 23 | 23 | 23 | 23 |
| Buttress thickness D [mm] | 7.5 | 5.5 | 7.5 | 7.5 | 7.5 | 7.5 | 7.5 | 7.5 | 7.5 | 7.5 | 7.5 |
| Maximum width thickness E [mm] | 5.0 | 4.5 | 5.4 | 5.0 | 5.0 | 5.0 | 5.0 | 5.0 | 5.0 | 5.0 | 5.0 |
| Bead thickness F [mm] | 9.5 | 9.5 | 9.5 | 9.0 | 10.0 | 9.5 | 9.5 | 9.5 | 9.5 | 9.5 | 9.5 |
| Ratio E/D | 0.7 | 0.8 | 0.7 | 0.7 | 0.7 | 0.7 | 0.7 | 0.7 | 0.7 | 0.7 | 0.7 |
| Ratio F/E | 1.9 | 2.1 | 1.7 | 1.8 | 2.0 | 1.9 | 1.9 | 1.9 | 1.9 | 1.9 | 1.9 |
| Thickness of Outer apex rubber [mm] | 1.5 | 1.5 | 1.5 | 1.5 | 1.5 | 1.0 | 1.5 | 1.5 | 1.5 | 1.5 | 1.5 |
| Presence (P) or Absence (A) of Outer apex rubber at Position (P2) | P | P | P | P | P | P | P | P | P | P | P |
| Complex elastic modulus E* of Outer apex rubber [MPa] | 26.0 | 26.0 | 26.0 | 26.0 | 26.0 | 26.0 | 23.0 | 29.0 | 26.0 | 26.0 | 26.0 |
| Loss tangent tanδ of Outer apex rubber (@70 degrees C.) | 0.12 | 0.12 | 0.12 | 0.12 | 0.12 | 0.12 | 0.11 | 0.13 | 0.12 | 0.12 | 0.12 |
| Thickness of Insulation rubber [mm] | 1.0 | 1.0 | 1.0 | 1.0 | 1.0 | 1.0 | 1.0 | 1.0 | 0.5 | 1.5 | 1.0 |
| Difference in Complex elastic modulus E* between Insulation rubber and Topping rubber [MPa] | 0 | 0 | 0 | 0 | 0 | 0 | 0 | 0 | 0 | 0 | 2.0 |
| Workability in Removal from Rims | 10 | 10 | 9 | 10 | 9 | 10 | 10 | 10 | 10 | 10 | 10 |
| Steering Stability | 10 | 9 | 11 | 9 | 11 | 9 | 8 | 11 | 9 | 10 | 10 |
| Durability | 10 | 9 | 10 | 9 | 10 | 9 | 10 | 8 | 8 | 10 | 8 |

TABLE 2

|  | Ex.12 | Ex.13 | Ex.14 | Ref.1 | Ref.2 | Ref.3 | Ref.4 | Ref.5 | Ref.6 | Ref.7 |
|---|---|---|---|---|---|---|---|---|---|---|
| Height of Inner apex rubber [mm] | 23 | 18 | 30 | 23 | 23 | 23 | 23 | 23 | 13 | 35 |
| Buttress thickness D [mm] | 7.5 | 5.5 | 7.5 | 7.5 | 7.5 | 7.5 | 7.5 | 7.5 | 7.5 | 7.5 |
| Maximum width thickness E [mm] | 5.0 | 5.0 | 5.0 | 4.0 | 7.0 | 5.0 | 5.0 | 5.0 | 5.0 | 5.0 |
| Bead thickness F [mm] | 9.5 | 9.5 | 9.5 | 9.5 | 9.5 | 8.0 | 14.0 | 9.5 | 9.5 | 9.5 |
| Ratio E/D | 0.7 | 0.7 | 0.7 | 0.70 | 0.70 | 0.70 | 0.70 | 0.50 | 0.7 | 0.7 |
| Ratio F/E | 1.9 | 1.9 | 1.9 | 2.38 | 1.36 | 1.60 | 2.80 | 1.90 | 1.9 | 1.9 |
| Thickness of Outer apex rubber [mm] | 1.5 | 1.5 | 1.5 | 1.5 | 1.5 | 1.0 | 1.5 | 1.5 | 1.5 | 1.5 |
| Presence (P) or Absence (A) of Outer apex rubber at Position (P2) | P | P | P | P | P | P | P | P | P | P |
| Complex elastic modulus E* of Outer apex rubber [MPa] | 26.0 | 26.0 | 26.0 | 26.0 | 26.0 | 26.0 | 26.0 | 26.0 | 26.0 | 26.0 |
| Loss tangent tanδ of Outer apex rubber (@70 degrees C.) | 0.12 | 0.12 | 0.12 | 0.12 | 0.12 | 0.12 | 0.12 | 0.12 | 0.12 | 0.12 |
| Thickness of Insulation rubber [mm] | 0 | 1.0 | 1.0 | 1.0 | 1.0 | 1.0 | 1.0 | 1.0 | 0.5 | 1.5 |
| Difference in Complex elastic modulus E* between Insulation rubber and Topping rubber [MPa] | 0 | 0 | 0 | 0.0 | 0.0 | 0.0 | 0.0 | 0.0 | 0 | 0 |
| Workability in Removal from Rims | 11 | 11 | 9 | 10 | 10 | 10 | 10 | 10 | 10 | 8 |
| Steering Stability | 9 | 9 | 11 | 8 | 9 | 8 | 7 | 5 | 6 | 9 |
| Durability | 7 | 9 | 10 | 6 | 5 | 5 | 4 | 7 | 5 | 7 |

From the test results, it was confirmed that the tires in the Examples improved the steering stability and the durability without compromising the removability from the rims.

DESCRIPTION OF REFERENCE SIGNS

1 pneumatic tire
2 tread portion
3 sidewall portion
4 bead portion
bead core
6 carcass
6A turned up ply
6a main body portion
6b turned up portion
8 inner apex rubber
9 outer apex rubber
50 insulation rubber
BL bead baseline
D buttress thickness
E maximum width thickness
F bead thickness
H tire section height

The invention claimed is:
1. A pneumatic tire comprising:
   a tread portion;
   a pair of sidewall portions;
   a pair of bead portions in each of which a bead core is embedded; and
   a toroidal carcass;
   wherein the carcass includes a turned up ply,
   the turned up ply includes a main body portion extending between the bead cores in a toroidal manner, and a pair of turned up portions, each turned up portion turned up around a respective one of the bead cores from an inside to an outside in a tire axial direction,
   each bead portion of the pair of the bead portions is provided with an inner apex rubber, extending from the respective bead core outward in a tire radial direction between the main body portion and the respective turned up portion of the turned up ply, and an outer apex rubber arranged adjacent to and axially outside the respective turned up portion,
   a height in the tire radial direction of each inner apex rubber is in a range of from 18 to 30 mm, and
   wherein on each axial side of the tire, a buttress thickness D which is the shortest distance from a tire outer surface to the carcass at a position P1 radially inwardly away from a maximum tire diameter position by 23% of a tire section height, a maximum width thickness E which is the shortest distance from the tire outer surface to the carcass at a maximum tire width position, and a bead thickness F which is the shortest distance from the tire outer surface to the carcass at a position P2 radially outwardly away from a bead baseline by 25 mm satisfy the expressions E≥4.5 mm, F≥9.0 mm, E/D=0.6 to 0.9, and F/E=1.7 to 2.2.

2. The pneumatic tire according to claim 1, wherein each outer apex rubber is formed of a rubber composition having a loss tangent tan δ of 0.13 or less.

3. The pneumatic tire according to claim 1, wherein each outer apex rubber is formed of a rubber composition having a complex elastic modulus E* of 23 MPa or higher.

4. The pneumatic tire according to claim 3, wherein the complex elastic modulus E* of the rubber composition of each outer apex rubber is both 23 MPa or higher and 30 MPa or lower.

5. The pneumatic tire according to claim 1, wherein each outer apex rubber is made of a rubber having a maximum thickness of 0.5 mm or more.

6. The pneumatic tire according to claim 5, wherein each outer apex rubber maximum thickness is both 0.5 mm or more and 2.0 mm or less.

7. The pneumatic tire according to claim 1, wherein each outer apex rubber is arranged over 50% or more of a radial area from the position P2 to the maximum tire width position.

8. The pneumatic tire according to claim 7, wherein each outer apex rubber has a radially innermost end located radially inside the respective position P2.

9. The pneumatic tire according to claim 1, wherein an insulation rubber is arranged between the main body portion and each of the turned up portions of the turned up ply.

10. The pneumatic tire according to claim 9, wherein each insulation rubber is made of a rubber having a maximum thickness of 0.5 mm or more.

11. The pneumatic tire according to claim 10, wherein the insulation rubber maximum thickness is both 0.5 mm or more and 1.5 mm or less.

12. The pneumatic tire according to claim 9, wherein the turned up ply is a cord ply in which a plurality of carcass cords are arranged along a longitudinal direction and coated with a topping rubber having a complex elastic modulus E*, each insulation rubber is formed of a rubber composition having a complex elastic modulus E*, and a difference between the complex elastic modulus of each insulation rubber and the complex elastic modulus of the topping rubber of the turned up ply is 2 MPa or less.

13. The pneumatic tire according to claim 1, wherein each of heights of the turned up portions of the turned up ply from the bead baseline is 50% or more of the tire section height.

14. The pneumatic tire according to claim 1, wherein an outermost end in the tire radial direction of each of the outer apex rubbers is arranged radially inside an outermost end in the tire radial direction of a respective one of the turned up portions.

15. The pneumatic tire according to claim 14, wherein a distance in the tire radial direction between the outermost end of each outer apex rubber and the outermost end in the tire radial direction of the turned up portion is 5 mm or more.

16. The pneumatic tire according to claim 1 wherein the tire is a light truck tire.

17. The pneumatic tire according to claim 1, wherein each inner apex rubber is formed of a rubber composition having a complex elastic modulus E* of both 18 MPa or higher and 36 MPa or lower.

18. The pneumatic tire according to claim 1, wherein, in each of the bead portions, the inner apex rubber tapers outward in the tire radial direction, and the turned up portion of the turned up ply includes an arc-shaped curved portion convex toward the inner apex rubber along the axially outer side surface of the inner apex rubber.

19. The pneumatic tire according to claim 1, wherein each maximum width thickness E is 6.0 mm or less.

20. The pneumatic tire according to claim 1, wherein each bead thickness F is 10.5 mm or less.

\* \* \* \* \*